Jan. 11, 1944.   L. E. TURNER   2,338,883
MINE CAR COUPLING
Filed May 6, 1942   2 Sheets-Sheet 1

Inventor
Leon E. Turner

By Clarence A. O'Brien
and Harvey B. Jacobson   Attorneys

Jan. 11, 1944.    L. E. TURNER    2,338,883
MINE CAR COUPLING
Filed May 6, 1942    2 Sheets-Sheet 2
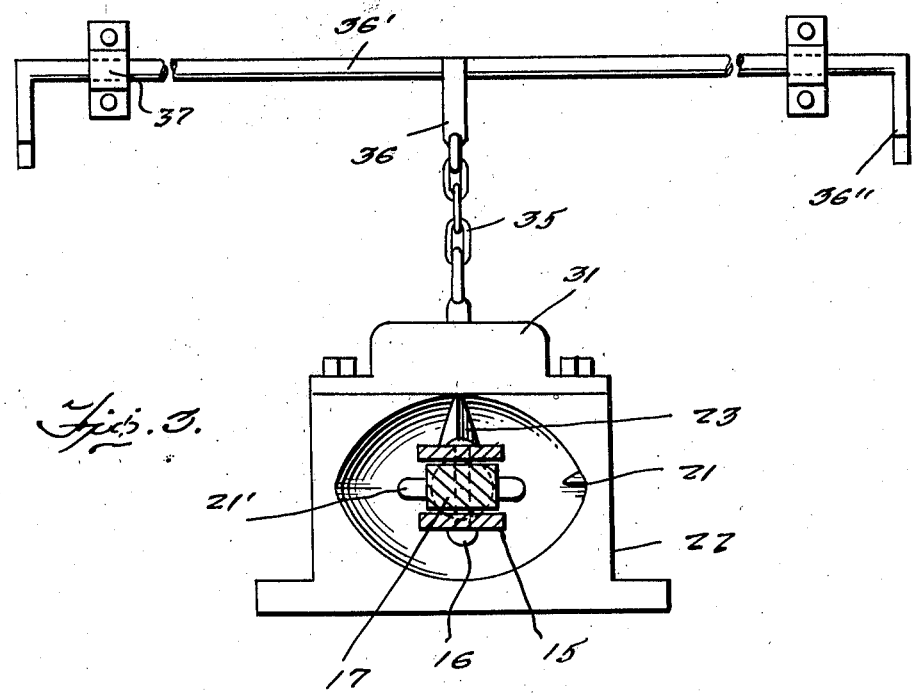
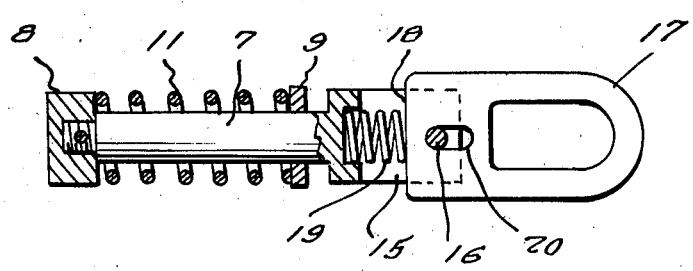
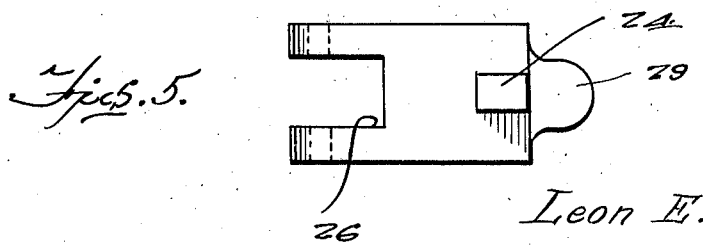
Inventor
Leon E. Turner
By *Clarence A. O'Brien*
and *Harvey B. Jacobson* Attorneys Patented Jan. 11, 1944

2,338,883

UNITED STATES PATENT OFFICE 2,338,883

MINE CAR COUPLING

Leon E. Turner, Toms Creek, Va., assignor of twenty two and one-half per cent to Cecil H. Baber, and twenty-two and one-half per cent to Ervin Wright, both of Stanaford, W. Va.

Application May 6, 1942, Serial No. 441,949

1 Claim. (Cl. 213—191)

The present invention relates to new and useful improvements in car couplings designed primarily for use upon mine cars, of a type where the car is intended to be tilted for emptying the same, and the invention has for an important object to provide a coupling device adapted to provide a swivel connection between the coupling members to facilitate tilting action of the cars.

A further object of the invention is to provide a swivel coupling member including a pivoted link adapted for engagement by the coupling pin and having guide means to guide the link into a horizontal position for receiving the coupling pin during the coupling movement.

A still further object is to provide a device of this character of simple and practical construction, which is efficient and reliable in performance, relatively inexpensive to manufacture and otherwise well adapted for the purposes for which the same is intended.

Other objects and advantages reside in the details of construction and operation as more fully hereinafter described and claimed, reference being had to the accompanying drawings forming part hereof, wherein like numerals refer to like parts throughout and in which:

Figure 3 is a vertical sectional view taken substantially on a line 3—3 of Figure 2.

Figure 4 is a top plan view of the coupling link and stem, and

Figure 5 is a bottom plan view of the coupling pin.

Figure 2:
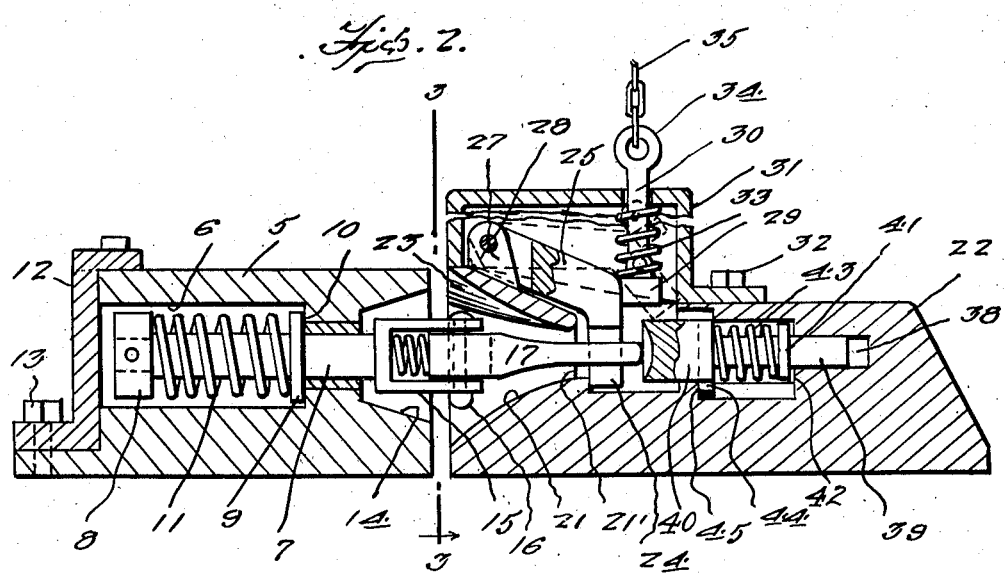
Figure 2 is a longitudinal sectional view.
Figure 1:
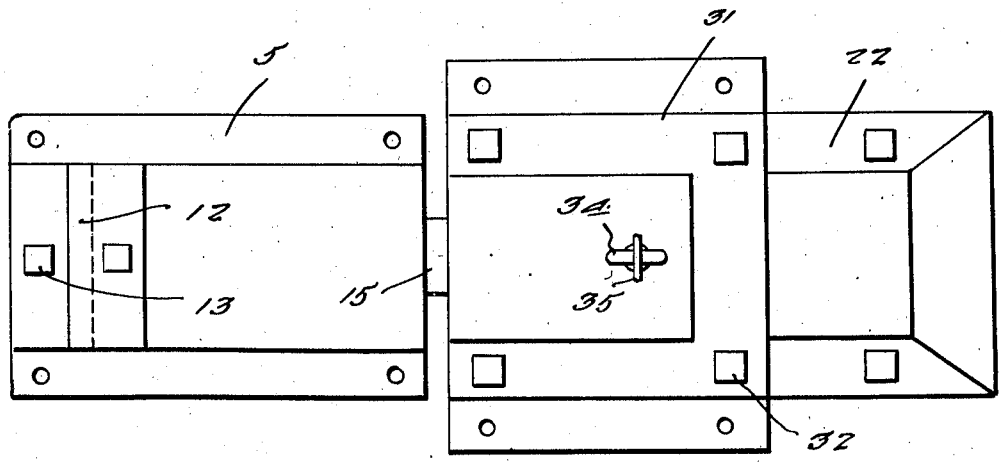
Figure 1 is a top plan view.

Referring now to the drawings in detail, wherein for the purpose of illustration I have disclosed a preferred embodiment of the invention, the numeral 5 designates a casting adapted for suitably attaching to one end of a mine car, such as by welding or the like, the casting having a bore 6 extending therethrough for slidably and rotatably receiving the stem or male coupling member 7.

The inner end of the stem is provided with a threaded nut 8 and mounted on the stem inwardly of the nut is a collar 9 adapted for engaging the shoulders 10 formed in the bore 6. Between the nut 8 and the collar 9 is a coil spring 11 adapted to retract the stem and responsive to a pulling force exerted on the outer end of the stem to provide a yieldable connection for the stem.

The rear end of the bore 6 is closed by a plate 12 secured in position by a nut 13.

The front end of the bore 6 is flared, as shown at 14, through which the front end of the stem 7 projects, the front end of the stem being formed with a yoke 15 having a pin 16 extending transversely thereof for pivotally attaching one end of a link 17 thereto, the link projecting forwardly of the stem 7. The inner end of the link 17 is flat transversely, as shown at 18, against which abuts a coil spring 19 bearing against the base portion of the yoke 15, as shown to advantage in Figure 4 of the drawings, to yieldably maintain the link in a longitudinally projecting position and restrain pivotal movement of the link on the pin 16. The pin 16 projects through a slotted opening 20 in the rear end of the link to permit limited longitudinal movement of the link.

The link 17 is adapted to project into the flared mouth 21 of the female coupling member 22 which is welded or otherwise suitably secured to the adjacent end of another mine car, the inner end of the mouth terminating in an opening 21' for receiving the link. The upper surface of the flared mouth 21 is provided with a tapering cleat or rib 23 adapted for engagement by the edge of the link 17, should the latter enter the mouth in an upright position to guide the link into a horizontal position for receiving a coupling pin 24 which projects downwardly from a plate 25 having its upper end bifurcated as shown at 26, for pivotally attaching on a lug 27 by means of a pivot pin 28 formed on the top of the casting 22.

The rear edge of the plate 25 is formed with a lug 29 to which is pivotally attached the lower end of a pin 30 extending through a cap plate 31 secured on the top of the casting 22 by bolts 32. A coil spring 33 is positioned on the pin 30 with one end engaging the lug 29 and its other end engaging the cover 31 to yieldably urge the coupling pin 24 downwardly into coupling engagement with the link 17, as shown to advantage in Figure 2 of the drawings.

The upper end of the pin 30 is formed with an eye 34 to which a chain 35 is attached for connection with a lateral crank 36 formed on a rod 36' journaled in brackets 37 secured to the car, the ends of the rod projecting outwardly at the sides of the car and provided with angular handles 36'' for manipulation by the trainman.

The casting 22, immediately behind the link 17, is formed with a recess 38 in which is slidably mounted a pin 39 having a head 40 disposed in the path of the link 17, the pin 39 having a collar 41 positioned thereon abutting a shoulder 42 formed in the recess and engaged by collar 41 which bears one end of a spring 43, the other end of the spring engaging the head 40 to yieldably urge the same forwardly.

The head 40 is formed with a stop pin 44 engaging a shoulder 45 on the outer end of the recess 38 to limit outward movement of the pin 39. The head 40 also serves to support the lower end of the coupling pin 24 in an elevated position out of the path of the link 17 when the latter is entering the opening 21', and upon contact of the head with the coupling pin the head is moved inwardly and releases the coupling pin which then drops within the link.

The head 40 of the pin 30 also serves as a yieldable bumper for the link 17 when the same enters the female casting 22.

It will be apparent from the foregoing that the swivel connection for the coupling stem 7 enables the male and female members to rotate relative to each other so that the mine car to which the respective members are attached may be tilted for emptying the same.

It is believed the details of construction, operations and advantages of the device will be readily understood from the foregoing without further detailed explanation.

Having thus described the invention what I claim is:

A car coupling comprising a casting adapted for securing to one end of a car, a stem rotatably and reciprocably mounted in the casting and having a flat yoke at its outer end, an open link having a flat inner end slidably and pivotally mounted in said yoke, a second casting adapted for securing to one end of a second car and having a tapering guide mouth adapted to receive the link, a guide rib on one surface of the guide mouth adapted for engagement with an edge of the link to position the link horizontally upon entering the mouth, and a coupling pin carried by the second casting adapted for engagement with said link to secure the latter against withdrawal.

LEON E. TURNER.